(12) United States Patent
Allen

(10) Patent No.: US 7,977,948 B2
(45) Date of Patent: Jul. 12, 2011

(54) SENSOR DEVICE AND METHOD THEREOF

(75) Inventor: Anthony J. Allen, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 793 days.

(21) Appl. No.: 11/959,922

(22) Filed: Dec. 19, 2007

(65) Prior Publication Data

US 2009/0160982 A1 Jun. 25, 2009

(51) Int. Cl.
*G01R 31/08* (2006.01)
(52) U.S. Cl. .................... 324/522; 324/525; 324/527
(58) Field of Classification Search .................. 324/522, 324/525, 527
See application file for complete search history.

(56) References Cited

U.S. PATENT DOCUMENTS

| 5,150,062 | A | 9/1992 | Takeuchi | |
|---|---|---|---|---|
| 7,085,657 | B2* | 8/2006 | Drossel | 702/50 |
| 2009/0102493 | A1* | 4/2009 | Disney et al. | 324/719 |

\* cited by examiner

*Primary Examiner* — Amy He

(57) ABSTRACT

A sensor device determines a value based on a sensed parameter by applying a voltage across two voltage terminals of a sensor. In response, the sensor provides an electrical signal representative of a sensed parameter to a controller via a pair of conductors. The controller samples the electrical signal to determine the value. In addition, the controller alternates the polarity of the voltage applied to the voltage terminals, thereby reducing the risk of damage to the conductors due to ion drift.

17 Claims, 5 Drawing Sheets

US 7,977,948 B2

SENSOR DEVICE AND METHOD THEREOF

FIELD OF THE DISCLOSURE

The present disclosure relates to integrated circuit devices and more particularly to sensor devices incorporated in an integrated circuit.

BACKGROUND

Some electronic devices measure a physical parameter, such as temperature or pressure, using a sensor device having multiple integrated circuits. One of the integrated circuit typically includes an element that provides an electrical signal indicative of the physical parameter to a second integrated circuit via a pair of conductors. The electrical signal is sampled at a second integrated circuit to determine a value representative of the measured physical parameter. However, if the conductor pair transmitting the electrical signal is not properly insulated, the voltage potential across the pair resulting from the electrical signal can cause ion drift between the conductor materials, resulting in undesirable corrosion and damage to the conductors. This can be particularly problematic for small conductors that are in close proximity, such as bond wires. A protective gel can be placed around the conductors to inhibit the formation of an electrically conductive environment in the vicinity of the conductors, but these protective materials are costly, can lead to sensor reliability problems, and can degrade the sensors performance. Further, the gel materials can also make small packaging solutions difficult, undesirably increasing the minimum package size for the sensor device. Accordingly, a new sensor device would be useful.

DETAILED DESCRIPTION

A sensor device determines a value based on a sensed parameter by applying a voltage across two voltage terminals of a sensor. In response, the sensor provides an electrical signal representative of the sensed parameter to a controller via a pair of conductors. The controller samples the electrical signal to determine the value. In addition, the controller alternates the polarity of the voltage applied to the voltage terminals, thereby reducing the risk of damage to the conductors due to ion drift.

Figure 1:
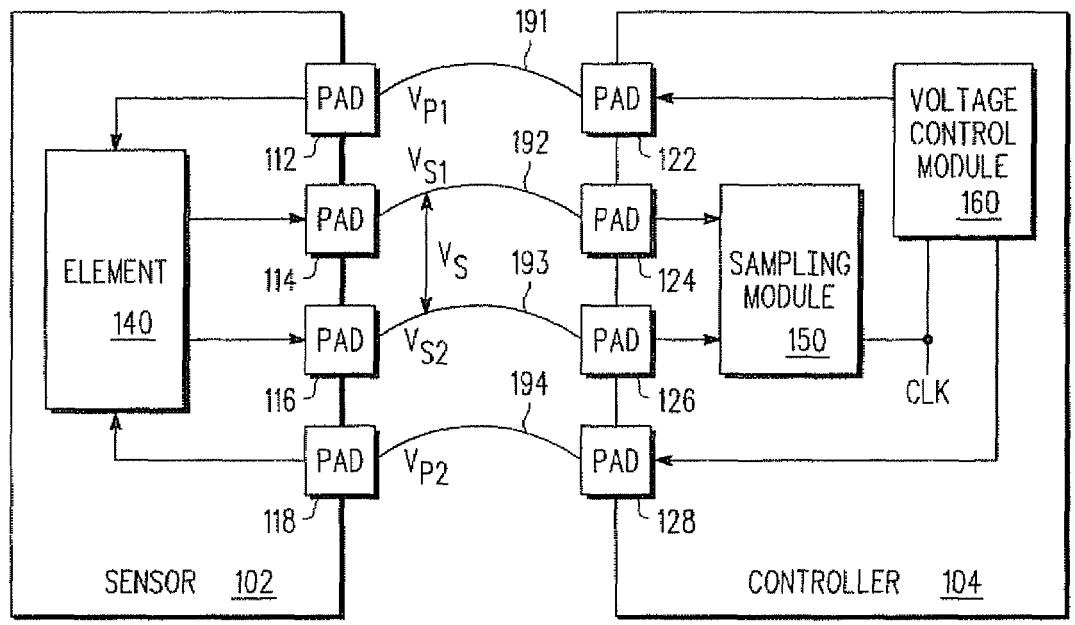
FIG. 1 is a block diagram of a particular embodiment of a sensor device in accordance with one aspect of the present disclosure.

Referring to FIG. 1, a block diagram of a particular embodiment of a sensor device 100 is illustrated. The sensor device 100 includes a sensor 102 connected to a controller 104 by conductors 191, 192, 193, and 194 (hereinafter "conductors 191-194"). In the illustrated embodiment of FIG. 1, the sensor 102 and the controller 104 are separate integrated circuit devices, and the conductors 191-194 are bond wires that communicate electrical signals between the devices. In the illustrated embodiment of FIG. 1, the conductors 191-194 are not encased in a gel or other protective material that prevents ion transfer between a conductor pair.

The sensor 102 includes an element 140 and bond pads 112, 114, 116, and 118. The bond pads 112, 114, 116, and 118 are connected to the conductors 191, 192, 193 and 194, respectively. The element 140 includes an input connected to the bond pad 112 to receive a voltage labeled $V_{P1}$, an input connected to the bond pad 118 to receive a voltage labeled $V_{P2}$, an output connected to the bond pad 114 to provide a voltage labeled $V_{S1}$, and an output connected to the bond pad 116 to provide a voltage labeled $V_{S2}$.

The controller 104 includes bond pads 122, 124, 126, and 128, connected to the conductors 191, 192, 193, and 194, respectively. The controller 104 also includes a sampling module 150 having an input connected to the bond pad 124 to receive the voltage $V_{S1}$, an input connected to the bond pad 126 to receive the voltage $V_{S2}$, and an input to receive a clock signal labeled CLK. Further, the controller 104 includes a voltage control module 160 having an output connected to the bond pad 122 to provide the voltage $V_{P1}$, an output connected to the bond pad 128 to provide the voltage $V_{P2}$, and an input to receive the CLK clock signal.

The element 140 is configured to sense a value of a physical parameter such as a pressure or a temperature, and to provide an electrical signal via the conductors 192 and 193 that is representative of the sensed value. In particular, the sensor 102 applies the voltage $V_{S1}$ to the conductor 192 and the voltage $V_{S2}$ to the conductor 193, whereby a difference between the voltages $V_{S1}$ and $V_{S2}$, illustrated in FIG. 1 as the voltage $V_S$, is indicative of the sensed parameter. In the illustrated embodiment of FIG. 1, the element 140 is a passive element, so that the magnitude and polarity of the signal $V_S$ provided by the element 140 depend on the voltages, $V_{P1}$ and $V_{P2}$, received via the conductors 191 and 194 respectively. The difference between the $V_{P1}$ and $V_{P2}$ represents a power voltage, referred to herein as $V_P$.

The voltage control module 160 is configured to apply the power voltage $V_P$ across the conductors 191 and 194 to initiate a parameter measurement, and the sampling module 150 is configured to determine a value representative of the sensed physical parameter indicated by the resulting voltage $V_S$. In the illustrated embodiment of FIG. 1, the sampling module 150 takes multiple samples over a period of time, referred to herein as a sampling period, and determines a digital value based on the multiple samples. Accordingly, the digital value represents the value of the sensed parameter over the sampling period.

In operation, the voltage control module 160 initiates a sampling period by applying the voltage $V_P$ to the element 140 via the conductors 191 and 194. In particular, the voltage $V_P$ is applied across the bond pads 112 and 118, which are the voltage supply terminals for the sensor 102. In response, the element 140 provides the voltage $V_S$, which is representative of the sensed physical parameter. However, when the conductors 192 and 193 are located in an electrolytic environment, the potential difference represented by the voltage $V_S$ can cause ions to drift from one conductor to the other, thereby damaging the conductors. Accordingly, while sampling the electrical signal, the voltage control module 160 changes the polarity of the voltage $V_P$ applied via the conductors 191 and 194, thereby changing the polarity of the voltage $V_S$ to prevent ion drift and reduce the likelihood of damage to the conductors 192 and 193. This can be better understood with reference to FIG. 2.

Figure 2:
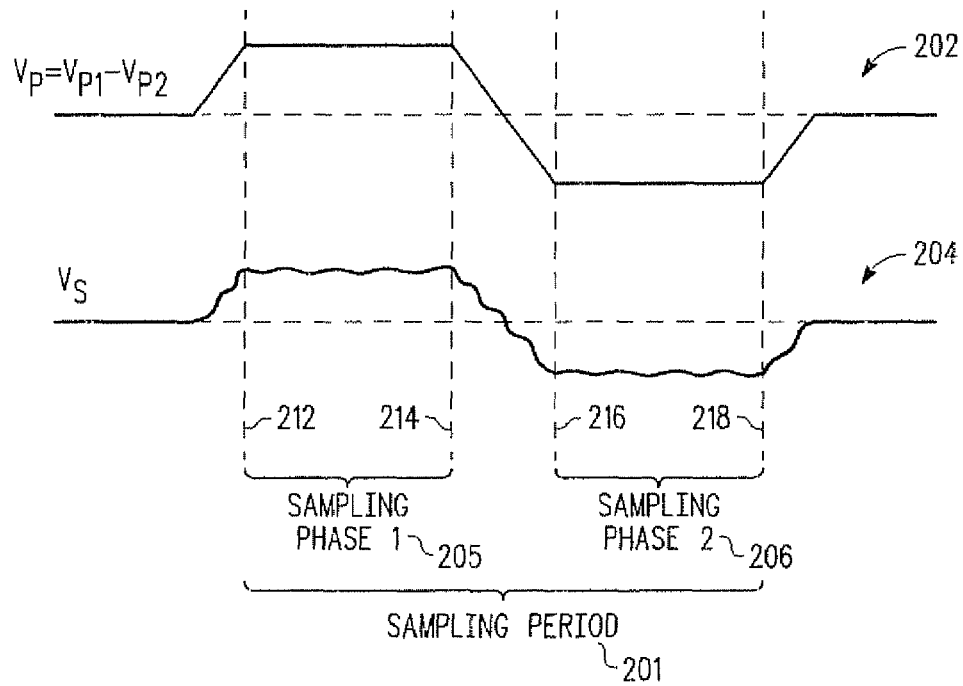
FIG. 2 is a diagram illustrating a particular embodiment of signal waveforms for signals associated with the sensor device of FIG. 1.

FIG. 2 illustrates a particular embodiment of waveforms for the voltages $V_P$ (representing the difference between the voltages $V_{P1}$ and $V_{P2}$) and $V_S$ of FIG. 1 for a sampling period 201. The voltage $V_P$ is represented by the waveform 202, while the voltage $V_S$ is represented by the waveform 204. As illustrated, the sampling period 201 takes place between time 212 and 218, and includes a sampling phase 205 (between times 212 and 214) and a sampling phase 206 (between times 216 and 218). In the illustrated embodiment of FIG. 2, the sampling module 150 takes one sample of the $V_S$ voltage during each of the sampling phases 205 and 206 and determines a digital value based on the two samples. The digital value is representative of the sensed parameter indicated by the $V_S$ voltage during the sampling period 201.

As illustrated in FIG. 2, the sampling period 201 is initiated at time 210 as the voltage control module 105 applies the voltage $V_P$ at a specified magnitude and with a positive polarity, thereby also increasing the magnitude of the voltage $V_S$ and giving it a positive polarity. During the sampling phase 205, also initiated at time 210, the sampling module 150 takes the first sample of the voltage $V_S$. Accordingly, by the end of the sampling phase 205, at time 214, the sampling module 150 has completed taking the first sample.

Further, at time 214 the voltage control module 160 reverses the polarity of the $V_P$ voltage, resulting in a change in polarity of the $V_S$ voltage. At time 216, the sampling phase 206 begins and the sampling module 150 takes a second sample of the voltage $V_S$. At time 218, the sampling period 201 ends, and the voltage control module 160 reduces the magnitude of the voltage $V_P$ to conserve power between sampling periods. The sampling and control module 105 uses the two samples obtained between times 212 and 218 to determine a digital value representative of the level of the sensed physical parameter as indicated by the voltage $V_S$.

As illustrated in FIG. 2, during the sampling phase 205 the voltages $V_P$ and $V_S$ have a positive polarity, and during the sampling phase 206 have a negative polarity. Thus, during the sampling phase 205 the conductors 191 and 192 have a positive polarity relative to the conductors 193 and 194, respectively, while during the sampling phase 206 the conductors 191 and 192 have a negative polarity relative to the conductors 193 and 194, respectively. This change in polarity reduces ion drift between the conductors 191-194, thereby reducing the likelihood of damage to the conductors.

In addition, in the illustrated embodiment of FIG. 2 the magnitude of the $V_P$ voltage is substantially the same during the sampling phases 205 and 206, such that the integral of the waveform 202 over the sampling period 201 is substantially zero. This further reduces the likelihood of ion drift between the conductors 191-194, and reduces the need for the conductors to be placed in a protective material.

Referring again to FIG. 1, the sampling module 150 and the voltage control module 160 are synchronized with the common clock signal CLK, so that sampling periods and application of the voltage $V_P$ are synchronized, as illustrated in FIG. 2.

Figure 3:
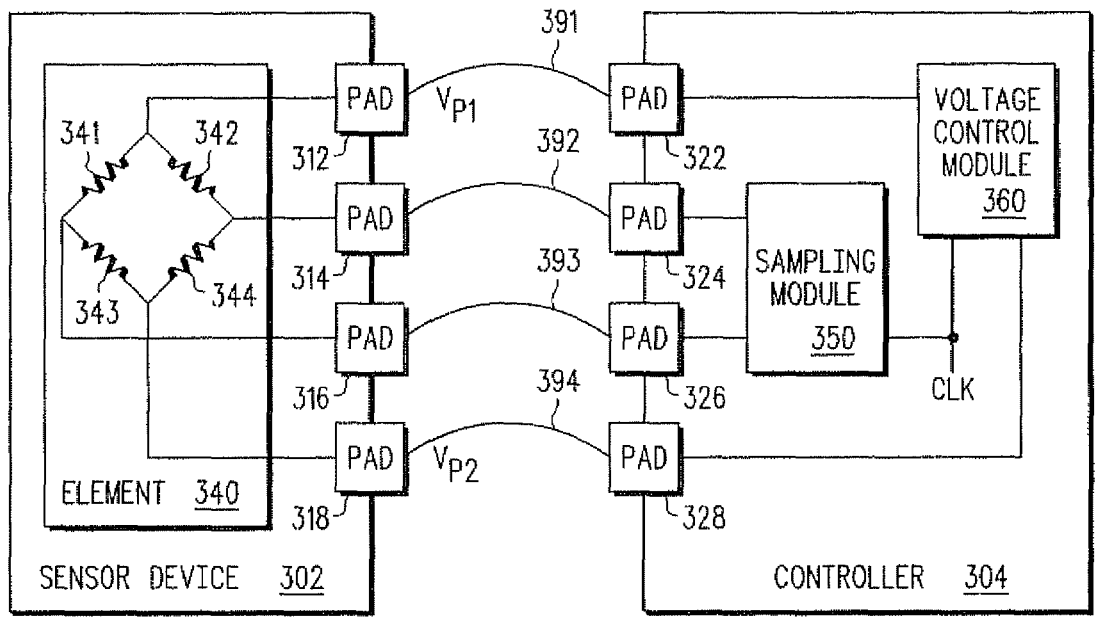
FIG. 3 is a block diagram illustrating a particular embodiment of the sensor device of FIG. 1.

Referring to FIG. 3, a block diagram of a particular embodiment of a sensor device 300, corresponding to the sensor device 100 of FIG. 1, is illustrated. The sensor device 300 includes a sensor 302 and a controller 304. The sensor 302 includes bond pads 312, 314, 316, and 318, connected to conductors 391, 392, 393, and 394, respectively. The sensor 302 also includes an element 340 having an input connected to the bond pad 312 to receive the voltage $V_{P1}$, an input connected to the bond pad 318 to receive the voltage $V_{P2}$, an output connected to the bond pad 314 to provide the voltage $V_{S1}$, and an output connected to the bond pad 316 to provide the voltage $V_{S2}$.

The element 340 includes passive circuit components 341, 342, 343, and 344 (components 341-344). The component 341 includes a first terminal connected to the bond pad 312 and a second terminal connected to the bond pad 316. The component 342 includes a first terminal connected to the bond pad 312 and a second terminal connected to the bond pad 314. The component 343 includes a first terminal connected to the bond pad 316 and a second terminal connected to the bond pad 318. The component 344 includes a first terminal connected to the bond pad 314 and a second terminal connected to the bond pad 318.

The controller 304 includes bond pads 322, 324, 326, and 328 connected to the conductors 391, 392, 393, and 394, respectively. The controller 304 also includes a sampling module 350 having an input connected to the bond pad 324 to receive the voltage $V_{S1}$, an input connected to the bond pad 326 to receive the voltage $V_{S2}$, and an input to receive the clock signal CLK. The controller 304 also includes a voltage control module 360 having an output connected to the bond pad 322 to provide the voltage $V_{P1}$, an output connected to the bond pad 328 to provide the voltage $V_{P2}$, and an input to receive the clock signal CLK.

As illustrated, the components 341-344 are represented as resistors. The resistive values of the components 341-344 vary based on variations in the physical parameter to be sensed. For example, the element 340 can be configured to sense pressure. As the pressure on the components 341-344 changes, the resistive value of each component changes. Accordingly, the voltage drop across each of the components 341-344 depends on the level of the sensed physical parameter. Therefore, as the voltage $V_P$ is applied across the conductors 391 and 394, the voltages at $V_{S1}$ and $V_{S2}$ will depend on the level of the sensed parameter. Further, in response to a reverse in polarity of the $V_P$ voltage, the polarity of the $V_{S1}$ and $V_{S2}$ voltages will also reverse, resulting in a change in polarity of the voltage $V_S$.

The voltage control module 360 controls the magnitude and polarity of the voltage $V_P$ to the sensor device 302. In particular, during a sampling period the voltage control module 360 alternates the polarity of the voltage $V_P$ by switching the polarity of the voltages $V_{P1}$ and $V_{P2}$ outputs. This in turn alternates the polarity of the $V_S$ voltage, thereby reducing the likelihood of ion drift between the bond wires 391-394.

The sampling module 350 samples the voltage $V_S$. In a particular embodiment, the sampling module 350 takes multiple samples of the voltage $V_S$ during each sampling period. For example, referring to FIG. 2, the sampling module obtains one sample during the sampling phase 205 and another sample during the sampling phase 206. The sampling module 350 then determines a digital value representative of the sensed parameter between times 212 and 218 by subtracting one sample from the other. This allows the digital value to be obtained while also allowing the polarity of $V_P$ to be changed to protect the conductors 192 and 193 from damage due to ion drift.

Figure 4:
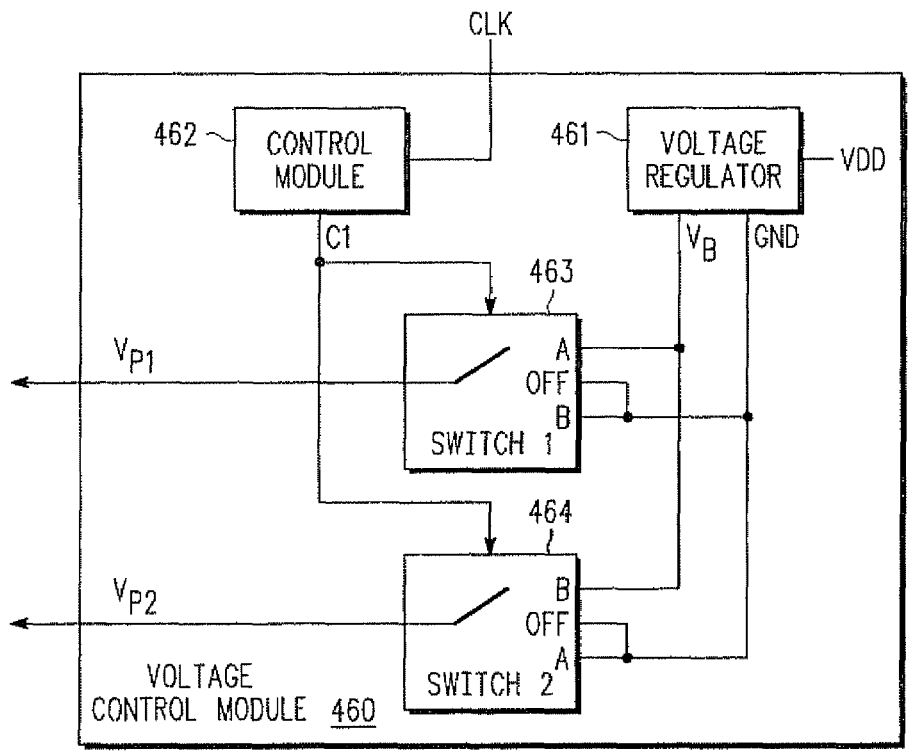
FIG. 4 is a block diagram of a particular embodiment of a voltage control module of the sensor device of FIG. 1.

Referring to FIG. 4, a block diagram of a particular embodiment of a voltage control module 460, corresponding to the voltage control module 360 of FIG. 1, is illustrated. The voltage control module 460 includes a voltage regulator 461, a control module 462, a switch 463 labeled SWITCH1, and a switch 464 labeled SWITCH2.

The voltage regulator 461 includes an input to receive a reference voltage labeled $V_{DD}$, an output to provide a voltage labeled $V_B$ and an output to provide a ground voltage labeled GND. The voltage regulator 461 is configured to provide a stable voltage based upon the $V_{DD}$ voltage as the voltage $V_B$, and also provides a stable ground reference voltage as the voltage GND.

The control module 462 includes an output to provide a control signal labeled C1 and an input to receive the clock signal CLK. The switch 463 includes an input labeled A connected to receive the voltage $V_B$, an input labeled OFF and an input labeled B, each configured to receive the GND voltage. The switch 463 also includes a control input to receive the C1 control signal, and an output to provide the voltage $V_{P1}$. The switch 464 includes an input labeled A and an input labeled B to receive the $V_B$ and GND voltages, respectively, of the voltage regulator 461 and input labeled OFF also to receive the GND voltage. In addition, the switch 464 includes a control input to receive the C1 control signal, and an output to provide the voltage $V_{P2}$.

The control module 462 provides the C1 control signal to control operation of the switches 463 and 464 and thereby control the polarity of the voltage $V_P$. Accordingly, based on the CLK clock signal, the control module 462 controls the timing of the polarity change in the voltage.

The switch 463 is controlled by a signal at its control input. Based on the control signal, the switch 463 connects one of its inputs A, B, and OFF to the switch output. The switch 463 can be configured to couple each input in succession in response to pulses in the control signal C1. Alternatively, the control signal C1 can be a multi-bit signal that indicates a specific input to be coupled to the output. The switch 464 is configured to connect one of its inputs A, B, and OFF to the switch output. Further, the switches 463 and 464 are configured so that, based on the control signal at the respective control inputs, each will connect the same input to the output of the respective switch. For example, in response to the control signal each of the switches 463 and 464 will connect the A input, the B input, or the OFF input to the output of the respective switch.

Figure 5:
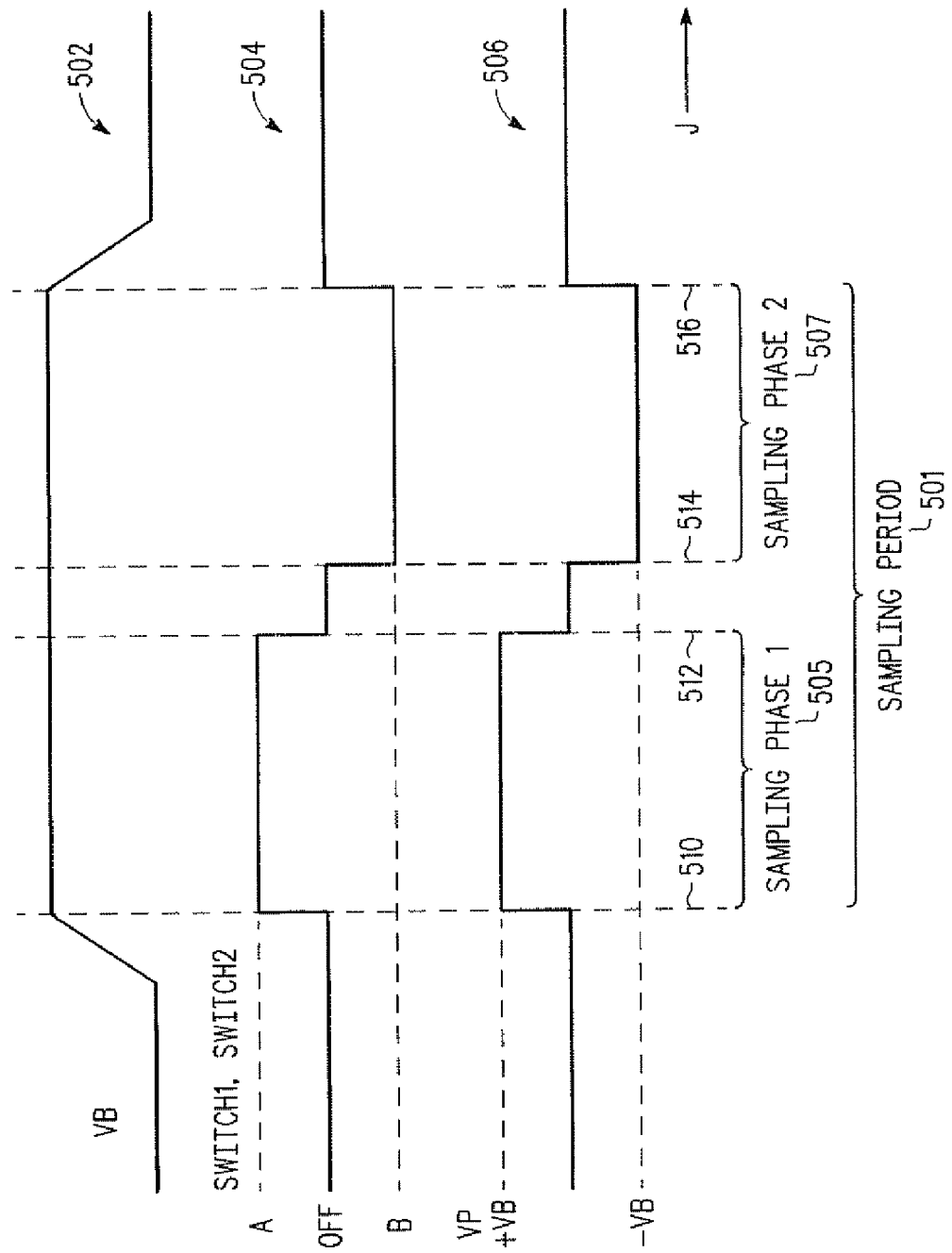
FIG. 5 is a diagram of a particular embodiment of signal waveforms for signals associated with the voltage control module of FIG. 4.

The operation of the voltage control module 460 may be better understood with reference to FIG. 5, which illustrates a particular embodiment of signal waveforms associated with the module. In particular, FIG. 5 shows a waveform 502, representative of the voltage at the output $V_B$ of the voltage regulator 461, waveform 504, representative of the state of the switches 363 and 464, and waveform 506, representative of the voltage $V_P$. As illustrated, a sampling phase 505 of a sampling period 501 begins at time 510 as the voltage at the $V_B$ output of the voltage regulator 461 reaches a specified magnitude. Also at time 510 the control module 462 places the switches 463 and 464 in the A position (i.e. so that the A inputs of each switch are connected to the respective switch output). Thus, the voltage $V_{P1}$ is substantially equal to the $V_B$ voltage, while the voltage $V_{P2}$ is substantially equal to a ground voltage. Therefore, the voltage $V_P$ is set to a positive polarity and a magnitude substantially equal to the $V_B$ voltage.

At time 512, the sampling phase 505 is complete and the control module 462 places the switches 463 and 464 in the OFF position. Thus, the $V_{P1}$ and $V_{P2}$ voltages are set to the same potential, and the magnitude of the voltage $V_P$ is set to substantially zero. This allows time for the $V_{P1}$ and $V_{P2}$ voltages to stabilize prior to placing switches 463 and 464 in the B position. This stabilization time increases the likelihood that the $V_P$ waveform will be substantially the same for both the sampling phase 506 and the sampling phase 507 thus providing a waveform having substantially zero integral over the sampling period 501 and thereby decreasing the likelihood of ion drift between the conductors 190-194.

At time 514, a second sampling phase, illustrated as the sampling phase 507, is initiated at the sampling module 350. At the same time, the control module 462 sets the switches 463 and 464 to the B position, thereby setting the $V_P$ voltage to a negative polarity and a magnitude substantially equal to the $V_B$ voltage. At time 516, the sampling module 350 has completed taking a second sample, and the control module therefore places both switches in the OFF position. Thus, as illustrated, the polarity of the $V_P$ voltage between time 514 and 516 is the reverse of the voltage polarity between time 510 and 512.

Accordingly, as illustrated in FIG. 5, the voltage control module 460 reverses the polarity of the $V_P$ voltage for each sampling phase of a sampling period such that, for each sampling period, the integral of the waveform 506 over time is zero. The reversal in polarity of the $V_P$ voltage in turn reverses the polarity of the $V_S$ voltage. This polarity reversal reduces the likelihood of ion drift between conductors of the $V_S$ and $V_P$ voltages, thereby reducing the likelihood of conductor damage.

Figure 6:
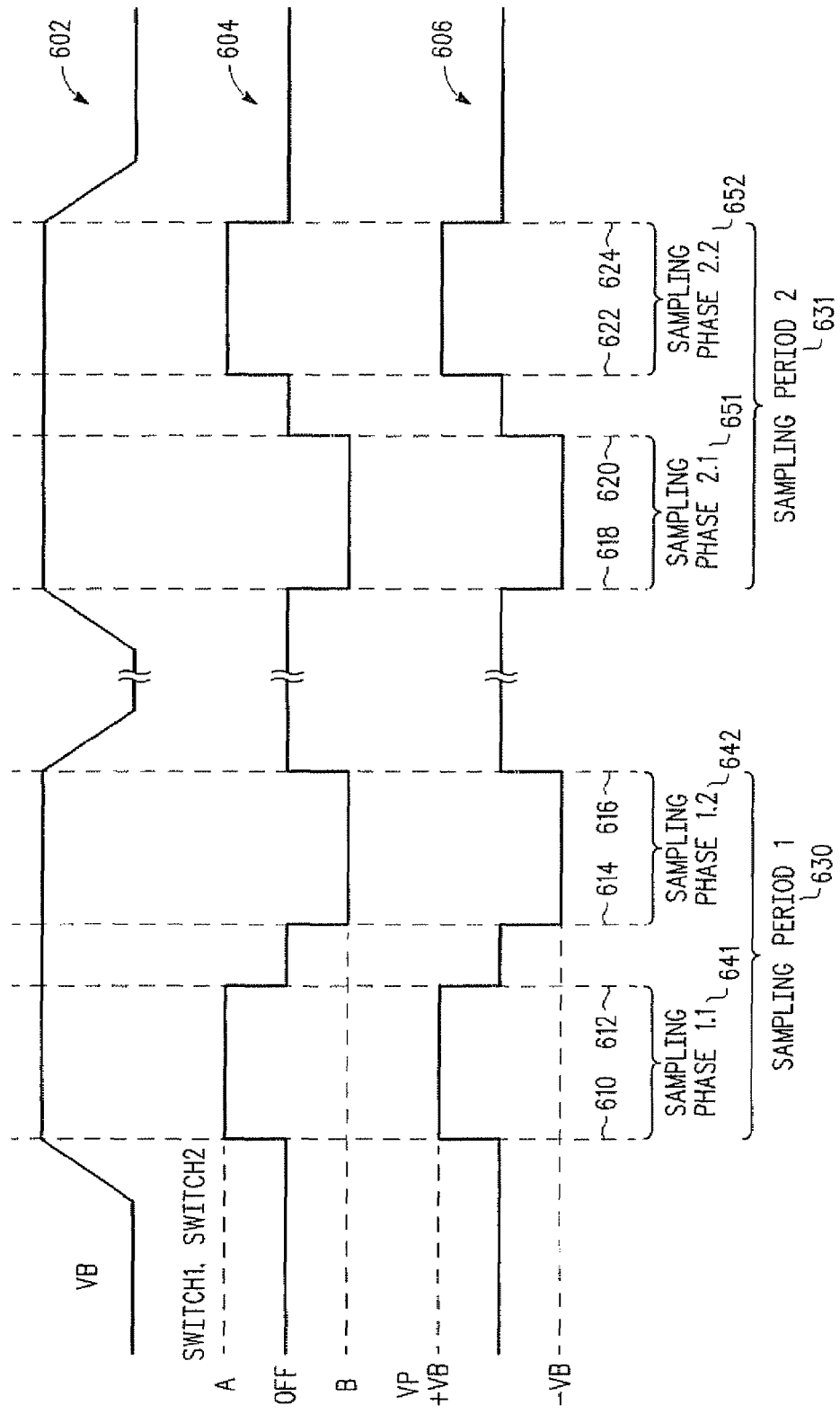
FIG. 6 is a diagram of an alternative embodiment of waveforms for signals associated with the voltage control module of FIG. 4.

Referring to FIG. 6, a particular embodiment of signal waveforms associated with the voltage control module 460 is illustrated. In particular, FIG. 6 shows a waveform 602, representative of the voltage $V_B$, waveform 604, representative of the state of the switches 363 and 464, and waveform 606, representative of the voltage $V_P$.

FIG. 6 shows two successive sampling periods for the sampling module 350, illustrated as sampling period 630 (the period between time 610 and 616) and sampling period 631 (the period between time 618 and 624). The sampling period 630 includes a sampling phase 641, between times 610 and 612, and a sampling phase 642, between times 614 and 616. The sampling period 631 includes a sampling phase 651, between times 618 and 620, and a sampling phase 652, between times 622 and 624.

In the illustrated example of FIG. 6, for the sampling period 630 the control module 462 controls the switches 463 and 464 similar to the fashion described with respect to the example of the sampling period 501 illustrated in FIG. 5. However, for the sampling period 631, the switches 463 and 464 are controlled to reverse the polarity of the waveform 606 relative to the first sampling period. Thus, the polarity of the $V_P$ voltage during the sampling phase 641, when the first sample of the sampling period 630 is obtained, is the reverse of the polarity of the $V_P$ voltage during the sampling phase 651, when the first sample of the sampling period 631 is obtained. Similarly, the polarity of the $V_P$ voltage during the sampling phase 642, when the second sample of the sampling period 630 is obtained, is the reverse of the polarity of the $V_P$ voltage during the sampling phase 652, when the second sample of the sampling period 631 is obtained.

The illustrated example of FIG. 6 addresses settling time delays that can cause the voltage $V_P$ not to settle to a stable value between the sampling phases in each of the sampling period 630 and 631. For example, if the voltage $V_P$ does not settle to zero magnitude by time 614 then the integral of the voltage $V_P$ over the sampling period 630 can have a net positive value. During the sampling period 631, the voltage $V_P$ will also not settle to zero magnitude by time 612, but will produce an integral of the voltage $V_P$ over sampling period 631 which has a net negative value. Accordingly, the integral of voltage $V_P$ over both sampling periods 630 and 631 will then have a substantially zero value due to the balancing action of the two sampling periods, reducing the likelihood of ion drift between the conductors 191-194.

Figure 7:
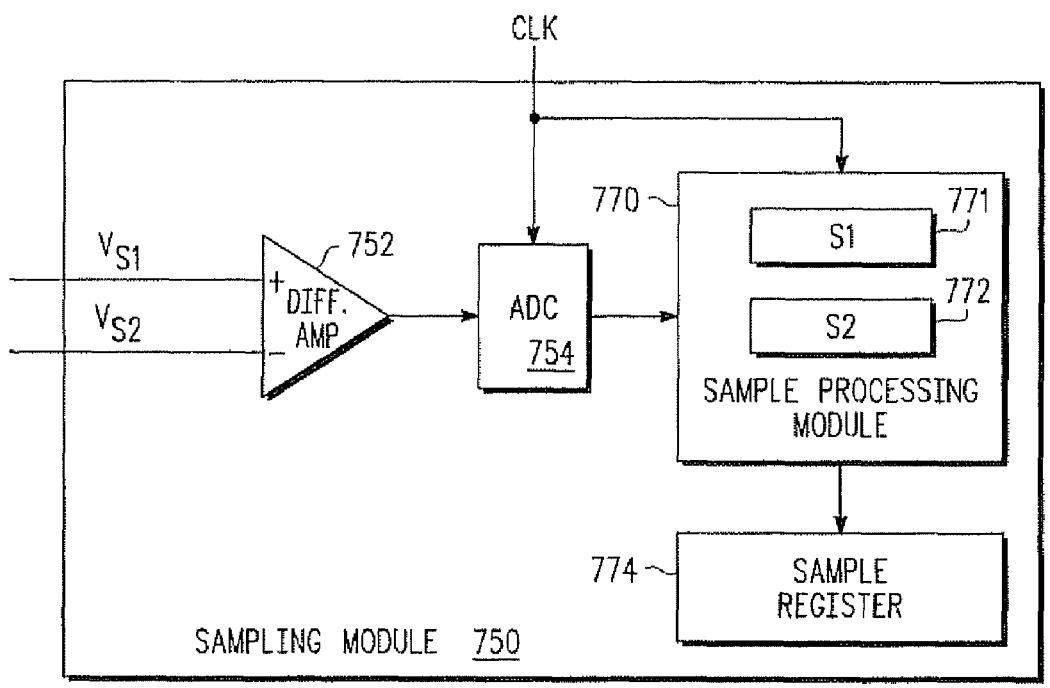
FIG. 7 is a block diagram of a particular embodiment of a sampling module of FIG. 1.

Referring to FIG. 7, a block diagram of a particular embodiment of a sampling module 750, corresponding to the sampling module 150 of FIG. 1, is illustrated. The sampling module 750 includes a differential amplifier 752, an analog to digital converter (ADC) 754, a sample processing module 770, and a sample register 774. The differential amplifier 752 includes inputs to receive the voltages $V_{S1}$ and $V_{S2}$, and an output. The ADC 754 includes an input connected to the differential amplifier 752, an input to receive the clock signal CLK, and an output. The sample processing module 770 includes an input connected to the output of the ADC 754, an input to receive the signal CLK, and an output. The sample register 774 includes an input connected to the output of the sample processing module 770.

The differential amplifier 752 is configured to determine a difference between the voltages at its inputs, and provide an output signal based on the difference. The differential amplifier 752 can also amplify or attenuate the difference according to specified parameters.

The ADC 754 samples the signal at the input and converts the sample to a digital output. In the illustrated embodiment of FIG. 7, the ADC 754 is synchronized to the clock signal CLK such that it takes once sample during each polarity phase of the voltage $V_P$, resulting in two samples per sampling period. The ADC converts each sample to a separate digital output.

The sample processing module 770 receives digital samples at its input, and includes registers 771 and 772. The sample processing module 770 is synchronized to the CLK clock signal such that it stores each successively received digital sample for a sample period in one of the registers 771 and 772. In addition, the sample processing module 770 is configured to process the samples stored at the registers 771 and 772 to determine a digital value for each sampling period. In a particular embodiment, the sample processing module 770 subtracts one sample value from the other to determine the digital value, and provides the result at the output for storage at the sample register 774. The sample register 774 can be accessed by other modules (not shown) of the controller 104, or by other devices (not shown) to retrieve the stored value. For example, the value can be retrieved by application software executing at a processor device to determine the sensed parameter at the sensor 102.

In operation, the differential amplifier 752 receives voltages from the sensor 102 indicating the value of a sensed parameter, and provides a signal indicative of the difference between the voltages to the ADC 754. The polarity of this difference will change as the polarity of the voltage $V_P$ changes, as illustrated in FIG. 2. The ADC 754 takes two samples of the signal provided by the differential amplifier 752 for a given sample period. In particular, the ADC 754 takes one sample for each polarity of the signal and converts each sample to a digital sample. The sample processing module 770 stores the digital samples in the registers 771 and 772, and provides a digital value based on the digital samples to the sample register 774. The sample register 774 stores the digital value for subsequent access by another module or device.

Figure 8:
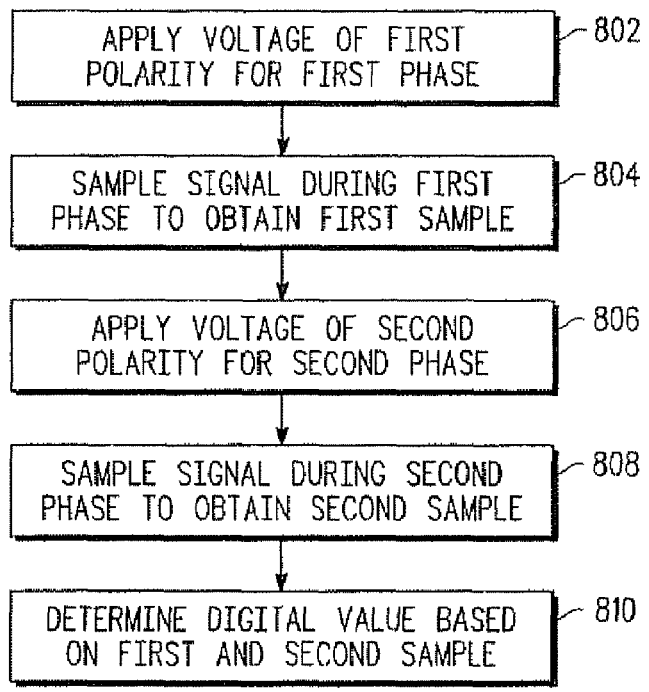
FIG. 8 is a flow diagram of a particular embodiment of a method of sampling a sensed parameter in accordance with one aspect of the present disclosure.

Referring to FIG. 8, a flow diagram of a particular embodiment of a method of sampling a sensed parameter is illustrated. At block 802, a voltage having a first polarity is applied for a first period of time across voltage supply terminals of a sensor. At block 804, a signal representative of a sensed parameter is sampled during the first period to obtain a first sample. At block 806, a voltage having a second polarity, opposite the first polarity, is applied for a second period of time across the voltage supply terminals of the sensor. At block 808, the signal representative of the sensed parameter is sampled during the second period to obtain a second sample.

At block 810, a digital value representative of the sensed parameter during the first and second periods is determined based on the first and second samples.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, comprising:
    sampling a signal provided by a sensor via a pair of conductors during a first phase of a first sampling period to obtain a first sample, the signal representative of a sensed parameter;
    sampling the signal during a second phase of the first sampling period to obtain a second sample;
    applying a first voltage of a first polarity across first and second voltage supply terminals of the sensor for the first phase;
    applying a second voltage of a second polarity across the first and second voltage supply terminals for the second phase;
    applying a third voltage having a magnitude substantially equal to zero across the first and second voltage supply terminals during a third phase of the first sampling period, the third phase between the first and second phases; and
    determining a first value based on the first sample and the second sample, the first value representative of the sensed parameter during the first sampling period.

2. The method of claim 1, wherein the second phase is after the first, and further comprising:
    sampling the signal during a third phase of a second sampling period to obtain a third sample, the second sampling period after the first;
    sampling the signal during a fourth phase of the second sampling period to obtain a fourth sample, the fourth phase after the third;
    applying a third voltage of the second polarity across the first and second voltage supply terminals of the sensor for the third phase;
    applying a fourth voltage of the first polarity across the first and second voltage supply terminals of the sensor during the fourth phase; and
    determining a second value based on the third sample and the fourth sample, the second value representative of the sensed parameter during the second sampling period.

3. The method of claim 1, wherein the second sampling period succeeds the first sampling period.

4. The method of claim 1, wherein the pair of conductors are bond wires.

5. The method of claim 1, wherein a magnitude of the first voltage is substantially equal to a magnitude of the second voltage.

6. The method of claim 1, wherein the sensor comprises a plurality of resistive elements, a resistive value of each of the plurality of resistive elements varying based on the sensed parameter.

7. The method of claim 1, wherein the sensed parameter is pressure.

8. The method of claim 1, wherein the pair of conductors are in an electrically conductive environment during the first sampling period.

9. A method, comprising:
    applying a first voltage to a first voltage supply terminal of a sensor for a first phase of a sampling period and a second voltage to a second voltage supply terminal of the sensor for the first phase, a voltage difference between the first voltage and the second voltage having a first polarity;

receiving a signal indicative of a sensed parameter via a pair of conductors;

sampling the signal during the first phase of the sampling period to obtain a first sample;

applying a third voltage to the first voltage supply terminal for a second phase of the sampling period and a fourth voltage to the second voltage supply terminal for the second phase, a difference between the third voltage and the fourth voltage having a second polarity opposite to the first polarity;

applying a fifth voltage to the first voltage supply terminal and to the second voltage supply terminal during a third phase, the third phase between the first phase and the second phase;

sampling the signal during the second phase of the sampling period to obtain a second sample; and determining a value representative of the sensed parameter during the sampling period based on the first and second samples.

10. The method of claim 9, wherein the fourth voltage is substantially the same as the first voltage and the third voltage is substantially the same as the second voltage.

11. A device comprising:
a sensor comprising:
a first voltage supply terminal;
a second voltage supply terminal;
a first output coupled to a first conductor, the first output configured to provide a first voltage based on a sensed parameter;
a second output coupled to a second conductor, the second output configured to provide a second voltage based on the sensed parameter; and
a sampling module comprising a first input coupled to the first conductor and a second input coupled to the second conductor, the sampling module configured to:
sample a signal during a first phase of a first sampling period to obtain a first sample, the signal based on a difference between the first voltage and the second voltage;
sample the signal during a second phase of the first sampling period to obtain a second sample; and
determine a first value based on the first sample and the second sample, the first value representative of the sensed parameter during the first sampling period; and
a voltage control module configured to apply a voltage of a first polarity across the first and second voltage supply terminals for the first phase, and to apply a voltage of a second polarity across the first and second voltage supply terminals during the second phase and to apply a voltage across the first and second voltage supply terminals having a substantially zero magnitude during a third phase, the third phase between the first and second phases.

12. The device of claim 11, wherein the second phase is after the first and wherein:
the sampling module is further configured to:
sample the signal during a third phase of a second sampling period to obtain a third sample;
sample the signal during a fourth phase of the second sampling period to obtain a fourth sample, the fourth phase after the third; and
determine a second value based on the third sample and the fourth sample, the second value representative of the sensed parameter during the second sampling period; and
the voltage control module is further configured to apply a voltage of the second polarity across the first and second voltage supply terminals for the third phase, and to apply a voltage of the second polarity across the first and second voltage supply terminals for the fourth phase.

13. The device of claim 11, wherein the sampling module further comprises:
a differential amplifier comprising a first input coupled to the first output of the sensor, a second output coupled to the second output of the sensor, and an output; and
an analog-to-digital converter comprising an input coupled to the output of the differential amplifier and an output configured to provide a digital value based on a voltage at the input.

14. The device of claim 11, wherein the voltage control module comprises:
a first switch comprising a first input configured to receive a first reference voltage, a second input configured to receive a second reference voltage, a control input, and an output coupled to the first voltage supply terminal of the sensor, the output configured to selectively provide the first reference voltage or the second reference voltage based on a signal received at the control input;
a second switch comprising a first input configured to receive the first reference voltage, a second input configured to receive the second reference voltage, a control input, and an output coupled to the second voltage supply terminal of the sensor, the output configured to selectively provide the first reference voltage or the second reference voltage based on a signal received at the control input;
a control module comprising an output coupled to the control input of the first switch and to the control input of the second switch, the control module configured to provide a control signal at the output so that the first voltage is applied to the first voltage terminal during the first period and the second voltage is applied to the second voltage terminal during the first period.

15. The device of claim 11, wherein the first voltage terminal and the second voltage terminal comprise bond pads of an integrated circuit device.

16. The device of claim 11, wherein the sensor is in an electrically conductive environment during the first sampling period.

17. The device of claim 11, wherein the sensor further comprises:
a first resistive element comprising a first terminal coupled to the first voltage supply terminal and a second terminal coupled to the first output;
a second resistive element comprising a first terminal coupled to the first output and a second terminal coupled to the second voltage supply terminal;
a third resistive element comprising a first terminal coupled to the second voltage supply terminal and a second terminal coupled to the second output; and
a fourth resistive element comprising a first terminal coupled to the second output and a second terminal coupled to the first voltage supply terminal.

* * * * *